Patented Aug. 24, 1937

2,090,942

UNITED STATES PATENT OFFICE 2,090,942

PROCESS FOR THE PRODUCTION OF CYANHYDRINS

Reinhold Fick, Ludwigshafen-on-the-Rhine, Germany, assignor to I. G. Farbenindustrie Aktiengesellschaft, Frankfort-on-the-Main, Germany No Drawing. Application March 13, 1936, Serial No. 68,642. In Germany March 28, 1935

3 Claims. (Cl. 260—99.30)

This invention relates to improvements in the manufacture and production of cyanhydrins.

It has already been proposed to prepare aliphatic cyanhydrins by causing hydrocyanic acid to act on aliphatic carbonyl compounds, such as aldehydes or ketones, in the liquid phase and in the presence of catalysts, as for example oxides or hydroxides of the alkali or alkaline earth metals or alkali metal salts, such as alkali metal carbonates or cyanides. In this process, however, undesirable decompositions of the initial materials and polymerizations readily occur so that the cyanhydrins are frequently obtained in unsatisfactory yields and in a state of insufficient purity.

I have now found that the said difficulties are completely or at least to a great extent avoided by carrying out the reaction while employing alkaline earth metal cyanides, in particular calcium cyanide, as catalysts.

The reaction of the initial materials under the said conditions proceeds very smoothly and uniformly so that the most favourable reaction temperature for the initial materials used can be readily maintained. Generally a reaction temperature between about 30° and about 70° C. is employed. It is preferable to take care that only quite small amounts of water are present during the reaction. When the reaction is completed, the alkaline earth metal compounds can be filtered off from the cyanhydrin formed; any alkaline earth metal compounds dissolved in the liquid may be separated in the form of sulphates by the addition of sulphuric acid. The process according to this invention yields very pure cyanhydrins which are capable of direct use for the usual purposes.

It has already been proposed to carry out the reaction of aldehydes or ketones with hydrocyanic acid in the presence of small amounts of organic nitrogen bases; thus for example acetone with hydrocyanic acid in the presence of piperidine yields good yields of cyanhydrin. It could not be foreseen from this fact, however, that alkaline earth metal cyanides, which are quite different substances from organic nitrogen bases, would be eminently suitable for promoting the said reaction.

The following examples will further illustrate how my present invention may be carried out in practice but the invention is not restricted to these examples. The parts are by weight.

Example 1

270 parts of hydrocyanic acid containing about 5 parts of water are gradually added while stirring within 30 minutes to 580 parts of acetone in which 6 parts of an about 90 per cent finely-grained or pulverulent calcium cyanide are suspended. The temperature is kept at about 40° C. by cooling. When the development of heat has ceased, the whole is allowed to stand while stirring at ordinary temperature for about 12 hours. The acetone cyanhydrin formed is freed from the precipitate of calcium compound and a few drops of sulphuric acid are added until the whole is just acid. After separating any calcium sulphate thus precipitated, acetone cyanhydrin of excellent purity is obtained in a yield of about 98 per cent.

Example 2

270 parts of hydrocyanic acid containing about 5 parts of water are gradually added while stirring within 1 hour to 720 parts of butyraldehyde in which about 12 parts of finely grained or pulverulent calcium cyanide are suspended. The temperature is kept at from about 40° to 45° C. by cooling. After stirring the whole for a further 2 hours the reaction is finished. Butyraldehyde cyanhydrin is thus obtained as an almost colorless liquid with a yield of about 95 per cent. The hydrocyanic acid chemically bound in the calcium cyanide employed participates in the reaction.

The hydrocyanic acid may also be led into the butyraldehyde in vaporous form. Cyanhydrins of other aliphatic aldehydes are obtained in a corresponding manner.

What I claim is:—

1. In the production of cyanhydrins from aliphatic carbonyl compounds and hydrocyanic acid in the liquid phase, the step which comprises reacting a substance of the group comprising aliphatic aldehydes and ketones with hydrocyanic acid in the presence of a catalyst comprising essentially an alkaline earth metal cyanide.

2. In the process according to claim 1 the use of a catalyst comprising essentially calcium cyanide.

3. In the production of acetone cyanhydrin from acetone and hydrocyanic acid in the liquid phase, the step which comprises reacting acetone with hydrocyanic acid in the presence of a catalyst comprising essentially calcium cyanide.

REINHOLD FICK.